United States Patent [19]
Wilson et al.

[11] Patent Number: 5,537,006
[45] Date of Patent: Jul. 16, 1996

[54] POWER SUPPLY

[75] Inventors: Stephen S. Wilson, San Juan Capistrano; Mark E. Whitebook, Dana Point; Jay E. Philippbar, San Clemente, all of Calif.

[73] Assignee: Prolux Corporation, San Juan Capistrano, Calif.

[21] Appl. No.: 354,652

[22] Filed: Dec. 13, 1994

[51] Int. Cl.⁶ .................................................. H05B 37/00
[52] U.S. Cl. .................. 315/127; 315/136; 315/362; 315/194; 315/308
[58] Field of Search ........................ 315/127, 136, 315/362, 291, 308, 194, 307

[56] References Cited

U.S. PATENT DOCUMENTS

| | | | |
|---|---|---|---|
| 4,350,935 | 9/1982 | Spira et al. | 315/291 |
| 5,034,663 | 7/1991 | Cook, II et al. | 315/308 |
| 5,189,589 | 2/1993 | Marschall | 361/93 |
| 5,235,255 | 8/1993 | Blom | 315/224 |
| 5,265,003 | 11/1993 | Kayser et al. | 363/131 |
| 5,319,283 | 6/1994 | Elwell | 315/194 |

Primary Examiner—Frank Gonzalez
Assistant Examiner—Reginald A. Ratliff

[57] ABSTRACT

A power supply for an incandescent lamp by which sufficient power is supplied to the lamp to enable the lamp to reach its desired color temperature without exceeding the break over voltage of its filament even though the peaks of the alternating current voltage applied to the power supply exceed the break-over voltage of the filament of the lamp. This is achieved in a preferred embodiment by full-wave rectification of the alternating current voltage applied to the power supply to produced an unfiltered voltage comprising a series of half-cycle sine waves of a particular polarity. This voltage is applied to the lamp. However, when the voltage of each half cycle is above the breakover voltage of the lamp, the lamp is switched out of the circuit, so that only those portions at the beginning and end of each half cycle which are below a particular voltage are actually applied to the lamp.

10 Claims, 8 Drawing Sheets

POWER SUPPLY

BACKGROUND OF THE INVENTION

The invention is directed to an improved efficient, relatively simple, inexpensive, light-weight power supply having particular utility for energizing a low-voltage incandescent lamp from a conventional 115-volt AC line source.

In the design of illumination systems for such applications as theatrical lighting, photographic lighting, projection devices, and the like, selecting the appropriate lamp is critically important. For conventional incandescent lamps the selection is generally based on the following performance criteria:

a. Lamp power, which is proportional to the total illumination, that is, to the amount of light delivered by the lamp;

b. The characteristic color temperature of the lamp, namely, the color balance of the light emitted by the lamp, that is, the relative proportions of the light in each region of the visible spectrum. Color temperature is a critical parameter for photographic and projection applications, because it determines the accuracy of color rendition.

c. The configuration of the lamp filaments. Such filaments may be single or multiple, they may be disposed along the axis of the lamp, or transversely; they may be a straight wire, a helically coiled wire, or compound helically wound coils. For optimum illumination, the physical configuration of the filament must be matched to the geometry of the reflector used to direct the light. This often means that a particular reflector design must be specific to a given lamp type, and such a design is ineffective if a similar, but not exactly identical, lamp is used.

d. After parameters (a), (b) and (c) are selected, the operating voltage of the lamp must be considered. Under ideal circumstances, an incandescent lamp design could be specified independently by its power, color temperature, filament configuration and operating voltage. However, in actuality, the critical optical parameters of the lamp determine the operating voltage, so that when a fixed operating voltage is specified, the possible combinations of the other three optically relevant variables are constrained. The net result is that the best lamp for a particular application often operates at an inconvenient voltage.

With the exception of automotive products and battery-operated devices, most consumer electronic equipment are powered by the conventional line voltage (115 VAC, 60 Hz, single phase). Unfortunately, technically advanced illumination systems are seldom based on lamps which operate at this easily-obtainable Voltage. Far more common are applications for which the best lamp choice is a low-voltage design, requiring, for example, 12, 24 or 36 volts DC, or an equivalent AC voltage whose root-mean-square [RMS] voltage is equivalent to the nominal DC rating of the lamp.

Because of the conflict of the 115 VAC line voltage output, and a low-voltage DC lamp, the system designer has three conventional solutions at his disposal.

The first-and simplest solution is a power supply which uses a power transformer to step the line voltage down to the appropriate level. For example, a transformer wound for a 115 VAC primary and a 36 VAC (RMS) secondary will operate a 36-volt lamp directly with no other components. A potential disadvantage of such a power supply is the fact that the output voltage is unregulated, and any fluctuation of the line input voltage causes the voltage applied to the lamp to vary proportionally. Another disadvantage in the use of a transformer is that of weight. Transformers are made from iron and copper, and the amount of iron in the transformer is proportional to the amount of power the transformer must handle. For example, in order to drive a 400 watt lamp, the amount of iron required dictates a transformer weighing in the neighborhood of fourteen pounds. For many applications, such a weight cannot be tolerated.

The second conventional power supply available to the designer to reconcile a low-voltage lamp to 115 VAC line voltage is a linear DC power supply. The power supply consists a step down transformer, a full-wave rectifier bridge connected the secondary of the transformer which converts the stepped down to unfiltered DC, and a control stage which serves to regulate the DC voltage to the required value. Such a power supply overcomes the voltage variation shortcomings of the simple transformer approach, although at a cost of reduced efficiency due to increased heat losses in the circuit, and increased complexity. Moreover, the linear DC power supply still uses a transformer, so that the overall weight of the power supply includes the weight of the transformer and the additional weight of the regulation stage components.

A third conventional solution available to the designer of a power supply for driving a low-voltage lamp from the AC line is a switched power supply. Like the linear DC power supply, the output of the switched-mode power supply is a DC voltage. Unlike the linear DC power supply, the switched-mode power supply does not incorporate a transformer. Instead, unregulated full-wave rectified high-voltage DC is broken into short chopped packets of charge by means of a high speed series switch. The resulting chopped DC is smoothed into a nearly continuous flow of current by a large inductor/capacitor filter network in the output of the power supply, which filter network is connected in series with the load. The switched-mode power supply is lighter than the other power supplies which incorporate a transformer, and it is more efficient than the linear DC power supply. However, the switched-mode power supply is complex and therefore expensive. Switched-mode power supplies in the range of power ratings appropriate for energizing lamps, e.g., from around 100 watts to around 600 watts, cost on the order of $1.00 per watt, even in significant quantities. Accordingly, the cost of a switching power supply designed to drive a 400 watt lamp is approximately $400.00.

There is a fourth approach in the design of a power supply for controlling electrically energized lamps, but which is not suitable for driving low-voltage lamps from a high-voltage line. The fourth approach involves the use of a thyristor, such as a silicon-controlled rectifier (SCR) or triac circuit. The SCR is basically a gated diode. Like the conventional diode, the SCR blocks current in one direction (when "back-biased") but passes current in the other direction ("forward-biased"). Unlike the conventional diode, however, the SCR does not conduct in the forward-bias mode until it is "fired" by a signal applied to its control gate. If the SCR is fired at the beginning of a forwardbias input voltage cycle (i.e., the positive-going half of an AC sine wave), it will conduct the entire half cycle until the voltage drops to the zero-crossing line. At the zero-crossing, the SCR automatically turns "off," and it remains non-conductive until the next positive half-cycle and gate voltage command. The SCR can be turned on at any time during a positive-going half cycle to regulate the net time-averaged amount of power delivered to a load.

Accordingly, for each positive-going half cycle of the AC input voltage, the applied SCR gate voltage controls the phase angle, and therefore the time, at which the SCR will begin to conduct. The triac is similar to the SCR. However, the triac conducts in either direction when fired, and so it can be used to regulate power from both the positive-going and negative-going half cycles of the AC input voltage. Like the SCR, the triac stays in its conductive mode once fired, and automatically turns off at the zero-crossing point of the AC input voltage.

SCR and triac power supplies can be used, but they are not suitable to operate a low-voltage lamp from a high-voltage source. The reason for this is that neither power supply can be turned off on command, but must stay on until the next zero-crossing point of the AC voltage. However, SCR's and triacs may be used as efficient, low-cost dimmers to reduce the amount of light from a lamp which operates on the full 115 VAC line voltage.

The present invention provides a unique power supply having particular utility for powering a low-voltage incandescent lamp from a conventional 115 VAC line source without using either a transformer or a switched power supply technique. Accordingly, power supply of the present invention does not have the weight of the prior art transformer power supply circuits described above, or the cost, bulk and complexity of the prior art switched power supplies. The power supply of the present invention relies on the unique load characteristics presented by a low-voltage incandescent lamp, which will now be described.

High power, low-voltage incandescent lamps have heavy filaments, formed, for example, of tungsten wire having a relatively large cross section. This is because low-voltage operation requires lower filament resistance with correspondingly higher current. The corollary to heavy filaments is that their heat capacity, that is the product of the specific heat of tungsten multiplied by the mass of the filament, is high. High heat capacity creates a long thermal time constant of the order of seconds. A long thermal time constant means that the filament will not cool significantly during short (millisecond) modulated "off" times, or heat too rapidly during the "on" times. High heat capacity in a thermal system is analogous to a flywheel in a mechanical kinetic system, in that it resists rapid changes of its energy state. The heat capacity of the heavy tungsten filament acts as a thermal averager to smooth the fluctuations caused by temporal modulation.

The low-voltage tungsten lamp is effective in smoothing the effects of voltage fluctuation. This is also a corollary benefit of a long thermal time constant. An incandescent lamp is a near-classical black-body emitter. As a purely thermal device, the spectral content of its light is uniquely determined by its color temperature, and its gross light output is proportional to the emitting surface area of the filament. No matter how the tungsten lamp is driven, the characteristics of a particular lamp design are the same when the lamp reaches its specific design color temperature. For example, in the case of a 36-volt DC tungsten amp driven by an AC voltage, the peak voltage applied to the lamp oscillates between ±51 volts (36 volts multiplied by the square root of 2). When driven by 36 VAC (RMS), the light output of the lamp is the same as when it is driven by 36 volts DC. The only difference during AC operation is a slight 120 Hz modulation of the light output due to the filament cooling slightly below its nominal color temperature during the low-voltage portion of each cycle, and heating up slightly above its nominal color temperature during the maximum voltage peaks of the sine wave. In practice, this modulation is typically very small, of the order of 2% or 3%, and in any case it is not detectable by the human eye because the eye does not respond to flicker above about 20 Hz.

Of importance is that in order to operate a DC tungsten lamp by a sinusoidal AC voltage, the lamp must be capable of withstanding $\sqrt{2}$ higher voltage (For example: 51 volts versus 36 volts) at the peak of the applied voltage without damage. Typically, such lamps are commonly designed to be operable on both AC and DC voltages.. The output of the lamps is the same under both AC and DC drives fundamentally because, as a thermal device, it responds to the mathematical root-mean-square of the applied voltage.

The fact that a 36-volt lamp will withstand a peak voltage of 51 volts when driven by a sinusoidal (60 Hz) AC voltage does not mean that the lamp will withstand an arbitrarily higher voltage, even if that voltage is applied over a short time. This is another unique property of the incandescent lamp as an electrical load. At the outset, it appears that there is no reason why a 36-volt incandescent lamp should not withstand a very high voltage applied for a very short time, for example, 200 volts for 500 microseconds, if the total input energy for that brief period is not sufficiently high instantaneously to heat the filament beyond its melting point. However, this premise is not valid because the incandescent lamp has a more subtle characteristic, namely, it functions as a hot cathode. As a hot cathode, the filament is surrounded by a cloud of free electrons. For a closely-wound filament, i.e., one with the individual turns of the tungsten helix closely adjacent to one another, there is a limiting voltage at which the turn-to-turn potential will break over with the current being carried not through the wire, but from turn-to-turn through the electron cloud. When this turn-to-turn potential is exceeded, the lamp impedance drops precipitously, the current drawn by the filament increases at a rapid rate, and some part of the filament melts from excessive current density. This non-linear response is the reason why the applied voltage must always remain below the critical "break-over" value.

The power supply of the present invention converts supplied low harmonic alternating current into controlled energy by "waveform slicing." The resulting voltage waveform is useful for illuminating the tungsten filament lamp referred to above, which has a rated working voltage range lower than that of the RMS (root-mean-square) voltage value of the supplied incoming waveform. The voltage across the lamp is switched off anytime the input voltage to the power supply exceeds a predetermined level, thus preventing voltage breakdown, or avalanching, between adjacent hot turns of the filament of the incandescent lamp.

The power supply of the invention permits conduction of during the leading (or rising edge) of each half cycle of the applied voltage waveform, and this conduction continues to a specific voltage level. Then, the power supply has the capability, as needed, to turn off the central section of the waveform and interrupt current flow. The power supply is then capable of turning the voltage back on when the voltage falls back down to a specific level, allowing current flow again, until the voltage waveform falls to zero volts.

When powered with conventional AC line voltage, the power supply of the invention allows current to flow twice during each half cycle of the sine wave, which results in twice the refresh frequency compared with a conventional triac type of controller and four times the refresh frequency as compared with the SCR type. This results in a lower peak filament voltage for equivalent RMS (root-mean-square) voltages from either prior art type of power supply. Furthermore, with the refresh frequency of the power supply of the invention being twice to four times that of the prior art type of controller, the power supply of the invention also produces lower peak-to-peak filament color temperature ripple.

A slight asymmetry in the voltage waveform supplied to the lamp can reduce the peak-to-peak filament color temperature ripple even further.

BRIEF SUMMARY OF THE INVENTION

The power supply of the present invention takes advantage of the unique characteristics of a low-voltage incandescent lamp. The circuit of the invention is constructed to drive the incandescent lamp to its nominal color temperature by using only the lower-voltage portions of a high-voltage sine wave. Specifically, the power supply of the invention is constructed to take sufficient energy from the 115 VAC line during the first and last several degrees of each half cycle of the sine wave to heat the lamp filament to its design operating point without the voltage reaching the critical break-over value.

The foregoing, of course, is a completely different approach from the prior art switched-mode power supply. The prior art switched-mode power supply extracts brief "packets" of charge from the entire cycle of the alternating current line voltage irrespective of the voltage on the input, and the prior art switched-mode power supply is therefore "on" even during the highest-voltage intervals of each cycle. The discrete switched packets of charge extracted in the prior art switched-mode power supply must then be smoothed by a large inductor/capacitor (LC) filter to simulate continuous DC voltage. Without the LC filter, the lamp would fail immediately due to the break-over action described above.

In the unique power supply of the present invention, the function of the LC filter of the prior art switching supply is replaced by the intrinsic voltage-smoothing characteristics of the lamp itself, which are related to the heat capacity of the filament. As long as the critical break-over voltage is not exceeded, the lamp will tolerate constantly varying applied voltage. Compared with a switching power supply, the parts count, complexity, and bulk of the circuit of the present invention is substantially reduced by the absence of an LC filter network.

DETAILED DESCRIPTION OF THE ILLUSTRATED EMBODIMENTS

In order to comply with the cardinal rule of not exceeding the break-over voltage, while at the same time extracting enough power to reach the design color temperature from the sub-break-over portion of each cycle of the sine wave of the line voltage, it is important for the power supply circuit of the invention to take power from both sides of each sine wave cycle of the AC line. This is achieved in the circuits of the invention in the following manner. Briefly, in one implementation, the AC input voltage from the line is passed through a full-wave rectifier bridge to convert it from a train of alternating positive and negative half cycles to a train of all positive half cycles. This simplifies the remainder of each circuit, and permits the use of a single power device in series with the lamp to control the energization of the lamp. An alternative implementation of the circuit uses both positive and negative cycles, eliminating the rectifier bridge. However, the rectifier bridge is usually preferred because it is inexpensive, compact and provides an efficient means for simplifying the overall circuit.

Figure 1:
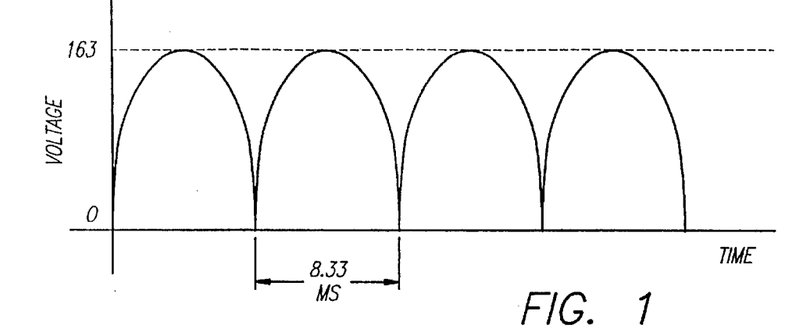
FIG. 1 is the waveform of an unfiltered output voltage derived from a bridge rectifier included in the circuit of the invention.

The output of the bridge rectifier is not filtered by a large capacitor in the power supply of the invention, as is the case in the prior art switched-mode power supply. Rather, the bridge rectifier output has the form of a series of discrete positive-going sinusoidal half cycles such as shown in FIG. 1. In the specific example of FIG. 1, the peak of each half cycle is 163 volts, and each half cycle has a duration of 8.33 milliseconds. The power switching device in the power supply of the invention may be, for example, a metal oxide semiconductor field-effect transistor (MOSFET) as is the case in the embodiment of FIGS. 3A and 3B; a bipolar transistor; or an insulated-gate bipolar transistor (IGBT) as is the case in the embodiment of FIGS. 4, 5A, 5B and 6. Whichever power switching device is used, it must be rated to withstand the full voltage of the line, and its peak and RMS current rating must be adequate to power the selected incandescent lamp. Since all the applied voltage is positive-going in the illustrated embodiments, only a single switch is required, and the switch does not need a diode to protect it from reverse voltage.

Figure 3A:
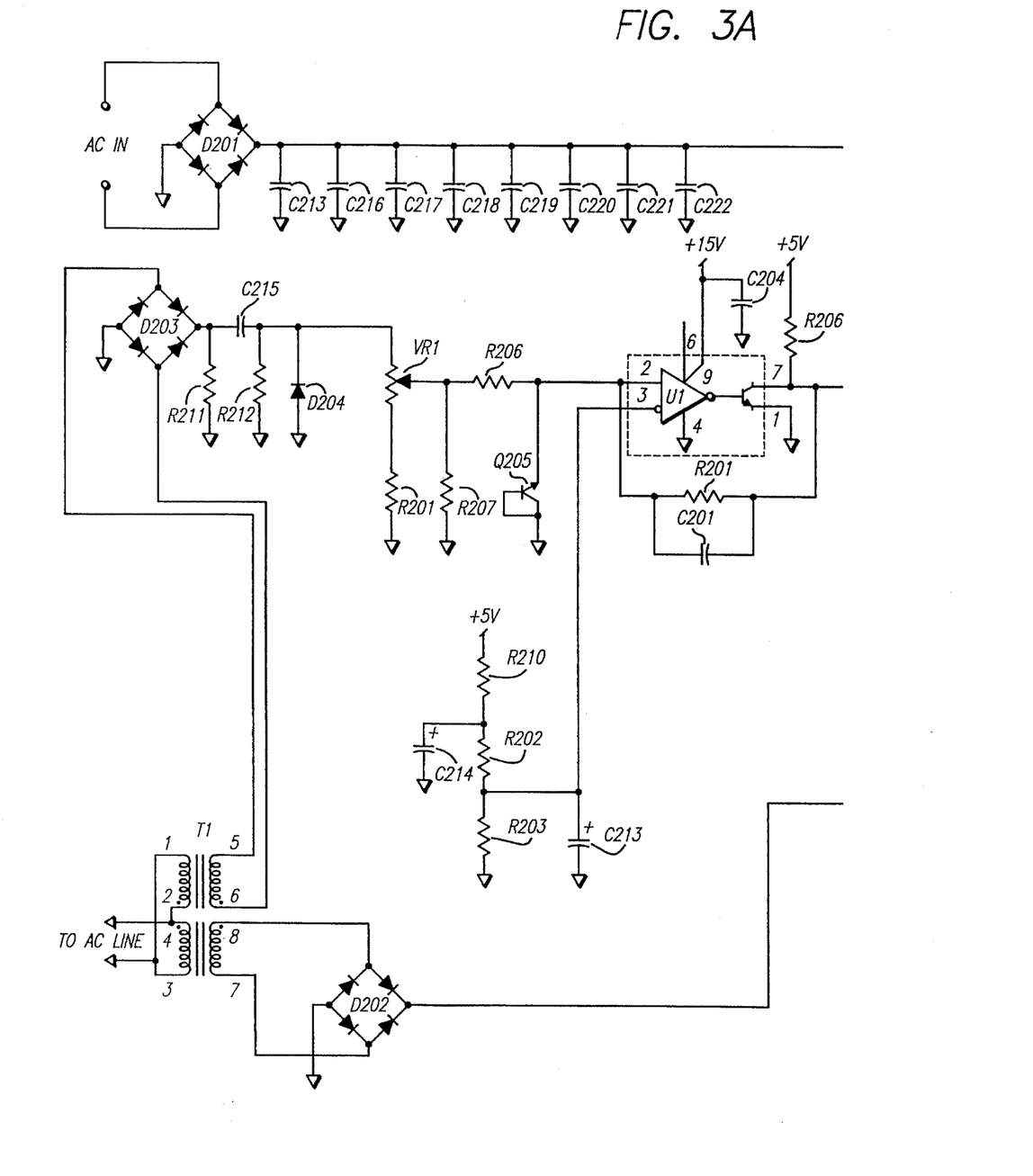
FIGS. 3A and 3B together represent a circuit diagram of one embodiment of the power supply of the invention.
Figure 3B:
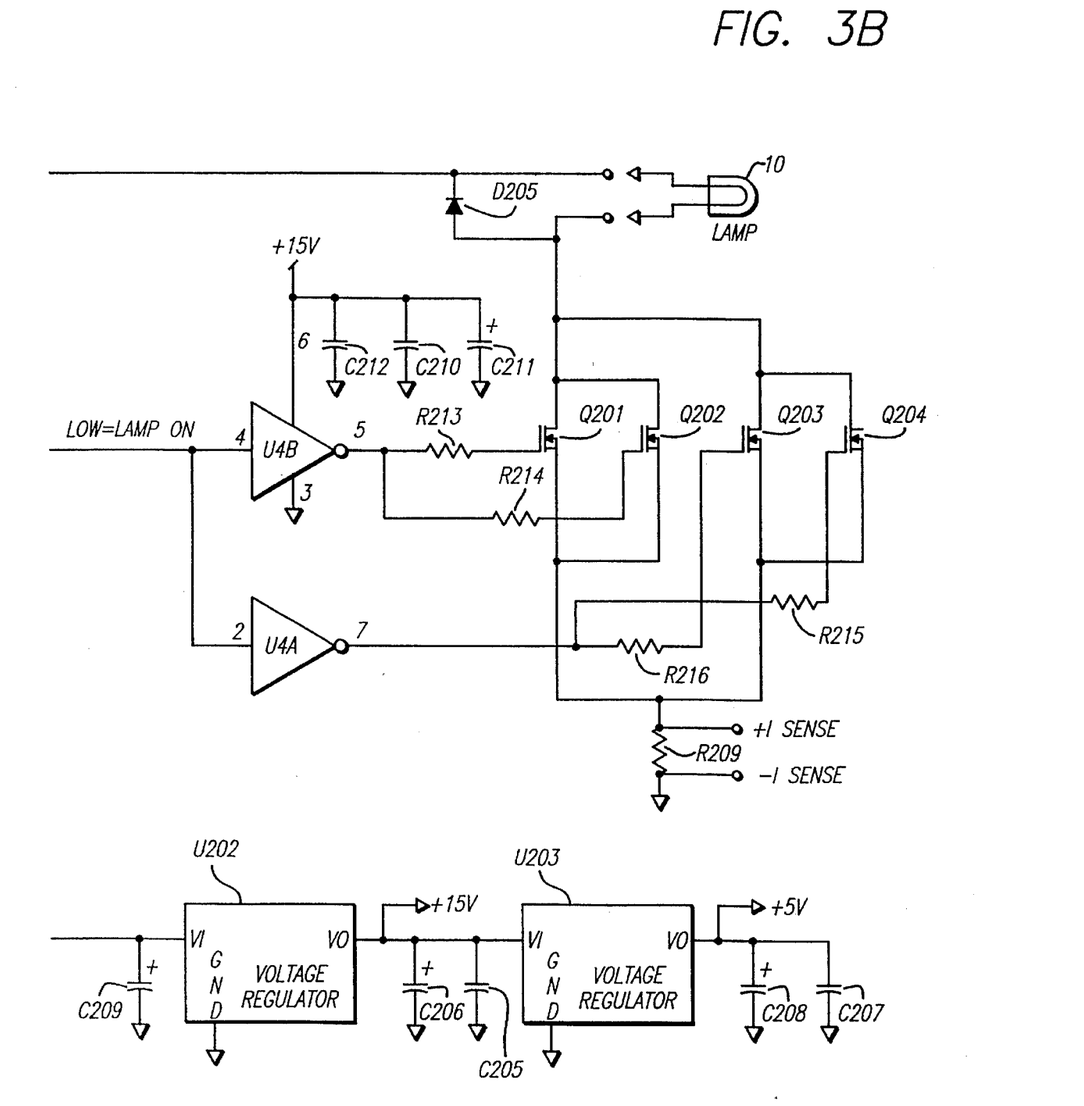

The circuit of FIGS. 3A and 3B utilizes four MOSFET's Q201, Q202, Q203 and Q204 to control the energization of an incandescent lamp 10. The MOSFET's each may be of the type designated IRF740. A first driver stage U4A is connected to the gate electrodes of the MOSFET's Q203 and Q204 through respective 47-ohm resistors R216 and R215. A second driver stage U4B is connected to the gate electrodes of the MOSFET's Q201 and Q202 through respective 47-ohm resistors R213 and R214. The drivers U4A and U4B may be of the type designated DS0026. The source electrodes of the MOSFET's are connected to a grounded 0.01-ohm resistor R209, through which a sense current I, flows for control or test purposes.

Alternating current is full-wave rectified by a diode bridge D201. The output voltage from the bridge is applied unfiltered to lamp 10 as a series of positive-going sine wave half cycles. A number of grounded 0.01-microfarad bypass capacitors C213, C216–C221, and a grounded 2.0-microfarad bypass capacitor C222, are connected to the output of the diode bridge D201 to attenuate high frequency voltage spikes, but these capacitors do not affect the fundamental waveform of the voltage from the diode bridge D201. Incandescent lamp 10 is shunted by a diode D205 of the type designated 1N4007, to prevent voltage spikes produced by inductive kickback.

Figure 2:
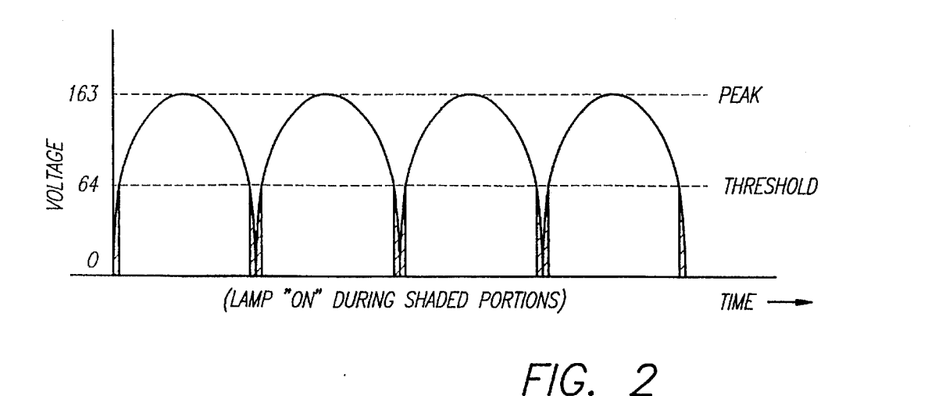
FIG. 2 is a waveform, like the wave form of FIG. 1, showing the voltage delivered to a lamp in the circuit of the invention and which is operated to sample portions of the output from the bridge rectifier, as will be described.

The MOSFET circuit described above is connected in series with lamp 10 and the diode bridge D201, and in accordance with the invention the MOSFET circuit causes the lamp 10 to be energized only during predetermined portions at the beginning and end of each positive half cycle of the voltage from the diode bridge during which the amplitude of the voltage is below the predetermined threshold of FIG. 2.

The MOSFET's are controlled by an alternating current sine wave voltage derived from a secondary of a transformer T1. The primary of the transformer is connected to the AC line. This alternating current is full-wave rectified by a diode bridge D203 which produces an unfiltered output comprising a series of positive-going sine wave half cycles. The output of diode bridge D203 is in relative phase with the output of the diode bridge D201.

The output voltage of diode bridge D203 appears across a grounded 10 kilo-ohm resistor R211. This voltage is applied through a phase-correction circuit, composed of a 1-microfarad capacitor C215 and a grounded 150 kilo-ohm resistor R212, to a 100 kilo-ohm potentiometer VR1. Potentiometer VR1 is connected to a grounded 1.5 kilo-ohm resistor R201, and the resistor and potentiometer are shunted by a clamping diode D204 of the type designated 1N914.

The moveable contact of potentiometer VR1 is connected through a 100 kilo-ohm resistor R206 to one input terminal of a comparator U1 of any appropriate known type. The moveable contact of potentiometer VR1 is also connected to a grounded 1 mega-ohm resistor R207. Resistor R206 is also connected to the emitter of an NPN transistor Q205 whose base and collector are connected to ground. Transistor Q205 may be of the type designated 2N3904, and it is connected as a low leakage clamping Zener diode.

The other input terminal of comparator U1 is connected to an RC network comprising a series of resistors R210, R202 and R203 connected between the positive terminal of a 5-volt direct voltage source and ground. Resistor R210 may be 10 ohms, resistor R202 may be 10 kilo-ohms, and resistor R203 may also be 10 kilo-ohms. The junction of resistors R210 and R202 is connected to a grounded 10-microfarad capacitor C214. The junction of resistors R202 and R203 is connected to a grounded 1-microfarad capacitor C213 and to the other input terminal of comparator U1 of the type designated LM311. This network establishes a predetermined reference voltage for the comparator of, for example, 2.5 volts. The open-collector output of the comparator U1 is connected to the inputs of drivers U4A and U4B.

As described above, only when the output from the diode bridge D203 is below the predetermined threshold does the comparator U1 develop an output state which causes the MOSFET's Q201–Q204 to be conductive and complete the circuit to lamp 10. On the other hand, whenever the voltage from the diode bridge D203 is above the predetermined threshold, the output state of comparator U1 changes and causes the MOSFET's to become non-conductive and interrupt the circuit to lamp 10.

Accordingly, the MOSFET switches are controlled by the simple comparator circuit U1 which has two inputs and one output. The first comparator input is a sample of the full-wave rectified line voltage from diode bridge D203. This output is reduced down to a level appropriate for the low-voltage comparator by the resistive divider including potentiometer VR1. The phase relationship between the voltage across the divider and the main voltage applied to the incandescent lamp 10 by diode bridge D201 is preserved.

The second input to the comparator U1 is a DC reference voltage of, for example, 2.5 volts. This reference voltage is established by the circuit including resistors R210, R202 and R203, described above. The reference voltage sets the comparator threshold, that is, the voltage at which the comparator output changes state. The threshold is set so that the comparator's output assumes a low state whenever the power-line voltage is below the reference voltage, and changes to a high state whenever the line voltages rises above the reference voltage.

The output of the comparator is then used to drive the inputs of U4A and U4B. The outputs of U4A and U4B drive the gates of MOSFET's Q201–Q204 which are connected in series with the lamp 10 and its power supply. The result is that the line voltage is applied to lamp 10 only when it is below the comparator switching threshold. When the line voltage is above the comparator switching threshold, the MOSFET's are turned off, and no voltage is applied to the lamp. Accordingly, the MOSFET's are turned on at both the beginning and end of each half cycle of the voltage from bridge D203, as shown in FIG. 2, since the voltage is below threshold at both locations.

The DC voltages for the embodiment of FIGS. 3A, 3B are produced by a full-wave rectifier diode bridge D202 connected to another secondary of transformer T1. The output of the bridge is appropriately filtered and regulated by the circuitry of blocks U202, U203 to supply both +15 volt DC and +5 volt DC voltages to the circuit of FIGS. 3A and 3B.

In accordance with the foregoing, the MOSFET's are turned on at both the beginning and end of each half cycle since the voltage is below threshold at both locations. This action is shown in the waveform of FIG. 2 in which the threshold is indicated as 64 volts. So long as the line voltage is below 64 volts, the MOSFET's are turned on, but when the line voltage rises above the threshold of 64 volts, the MOSFET's are turned off. The peak line voltage in FIGS. 1 and 2 is shown as 163 volts, which is nominal peak value of the AC line.

The amount of time that the controlled lamp is on during each half cycle in the example under consideration is given by expression:

$$t = (1/60 \text{ Hz}), (2 \sin^{-1}(64/163))/360 = 2.1 \text{ milliseconds}$$

The "off" time for the lamp during each half cycle therefore of the order of 6.2 milliseconds. Since the lamp's thermal time constant is of the order of seconds, the filament cools only a percent or so from its nominal color temperature during the "off" time, so the light output of the lamp is nearly constant. The combination of very small modulation depth and 240 Hz modulation rate makes the fluctuation impossible to detect by the eye.

It has been found that by applying the principles of the present invention the lamp 10 can be brought up to its nominal color temperature before the applied voltage exceeds the break-over threshold of the filament, and in the use of the circuits of the invention it has been found that there are no deleterious effects on lamp lifetime.

Accordingly, the power supply of the present invention provides the desired control for an incandescent lamp by taking power from each half cycle of the input voltage only during the time at the beginning of each cycle when the voltage is below a particular threshold and the time at the end of each cycle when the voltage again is below a particular threshold. This prevents the high-voltage peaks from reaching the controlled lamp and causing the break-over situation described above.

The conventional SCR/triac controllers are incapable of achieving the desired results discussed above. This is because although they can be turned on at any time during each half cycle of the line voltage, they will not turn off until the line voltage crosses zero. Accordingly, the conventional SCR circuit may be controlled to turn on the SCR at the trailing edge of each half cycle, and it will then be turned off at the zero-crossover point. However, if the SCR is turned on at the beginning of a half cycle in a conventional circuit to take advantage of the useful low-voltage energy available there, it must remain on through the entire half cycle until zero-crossing. The high voltage in the middle of the half cycle would then burn out the filament of the incandescent lamp. As a consequence, the SCR in a conventional control circuit can deliver power to the lamp only at the trailing edge of each half cycle if break-over is to be prevented, which is one-half as often as is possible in the circuits of the present invention.

To bring the lamp 10 up to design color temperature, a conventional SCR controller would have to deliver as much energy in the trailing edge of each half cycle, which is the only "on" time, as compared with the power supply of the present invention which produces energy in the paired "on" times in each half cycle. Accordingly, the SCR in the conventional controller would be required to remain "on" well into the "break-over" voltage level of each half cycle of the line voltage, subjecting the lamp 10 to destructive voltage levels.

Figure 4:
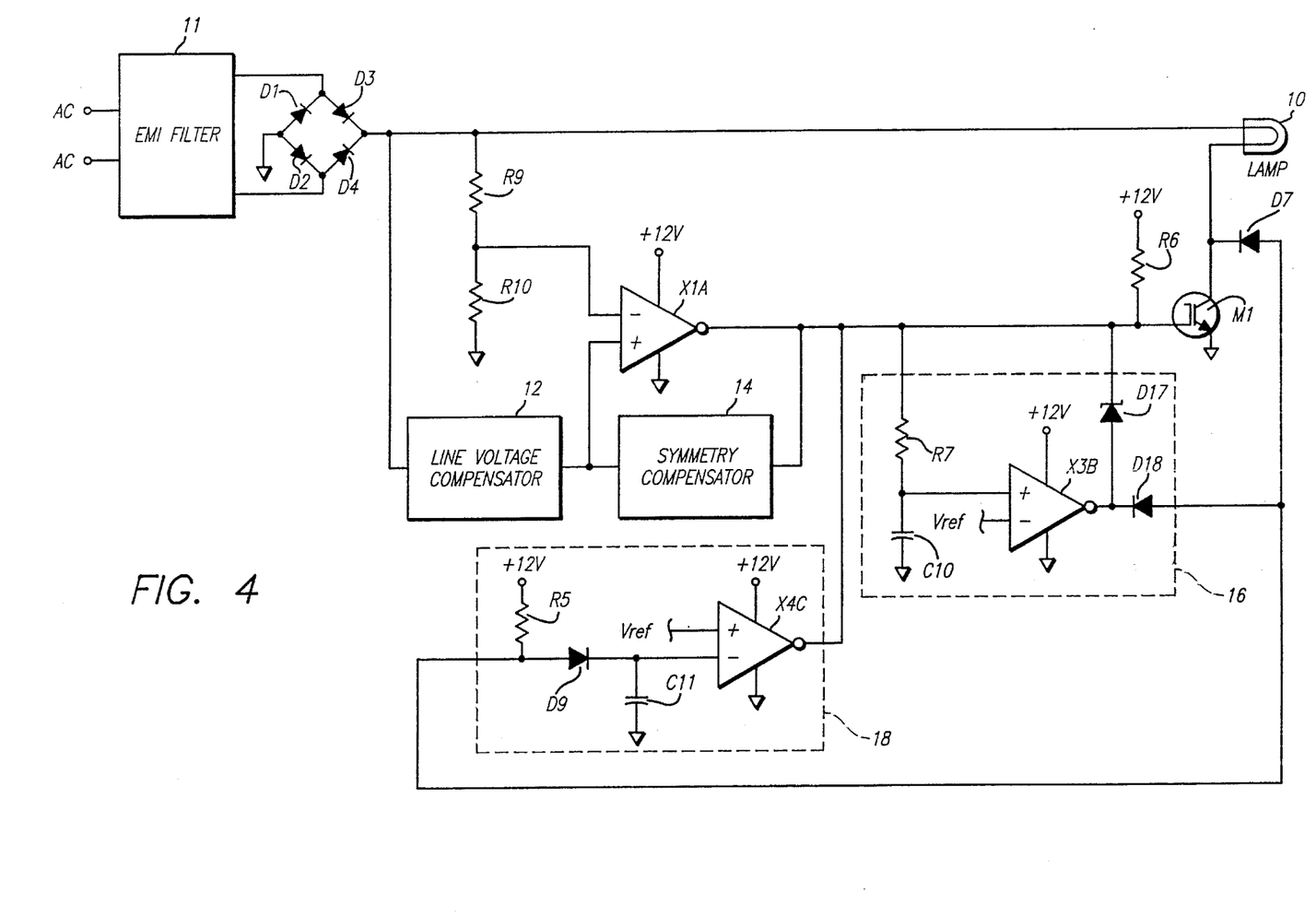
FIGS. 4A and 4B is a diagram, partly in block form and partly in circuit detail, of a second and preferred embodiment of the power supply of the invention.
Figure 4A:
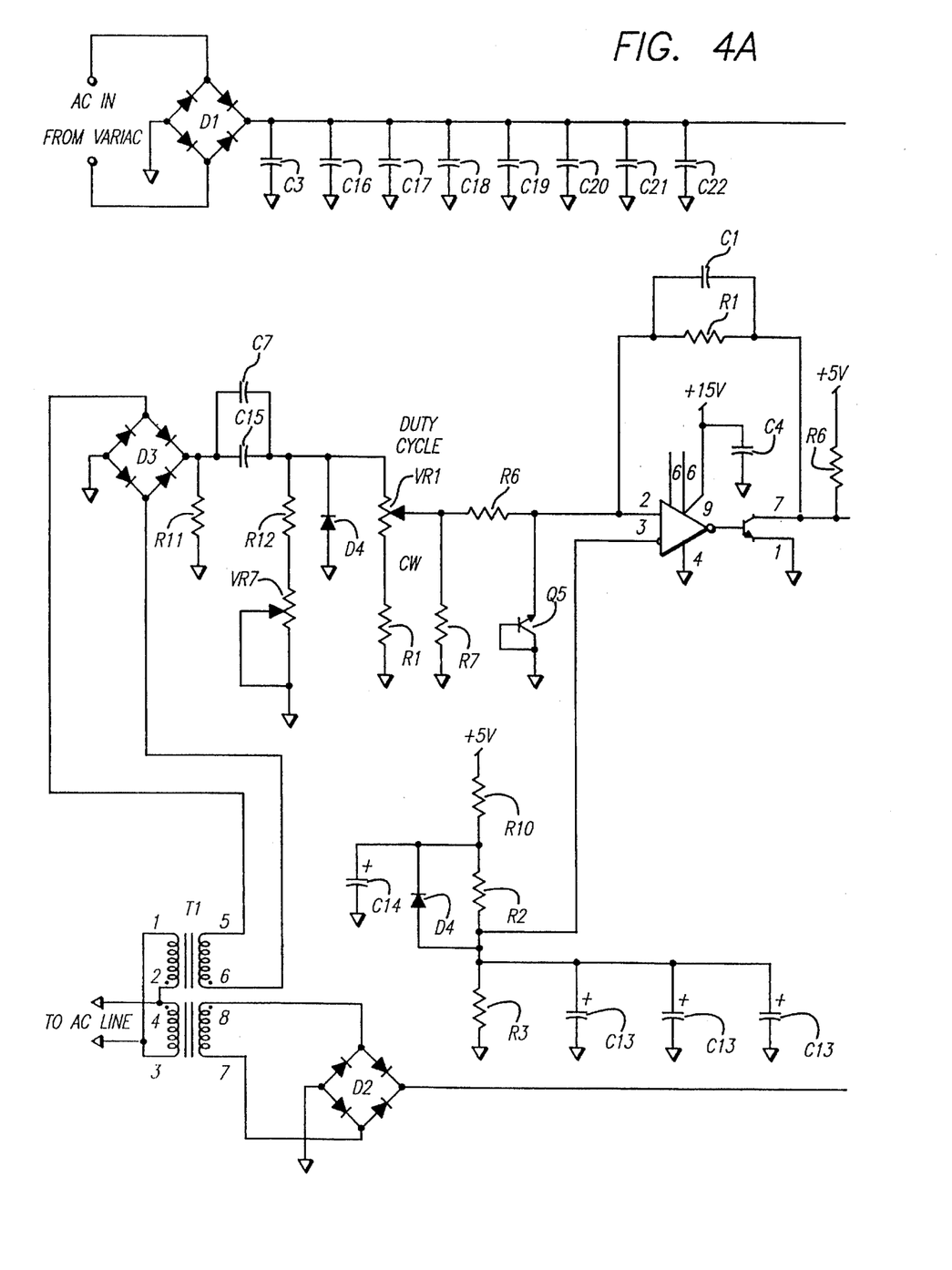
Figure 4B:
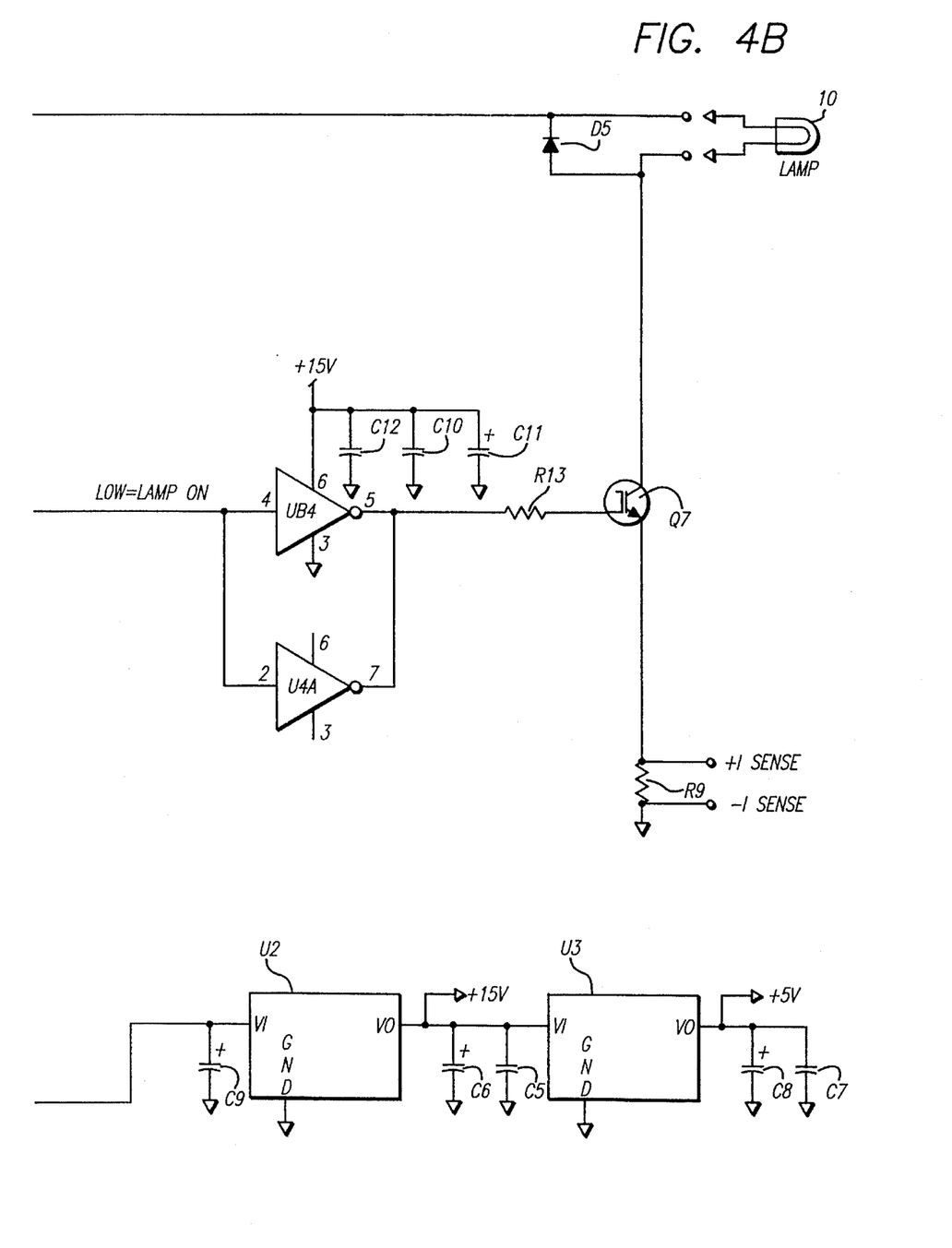
Figure 5A:
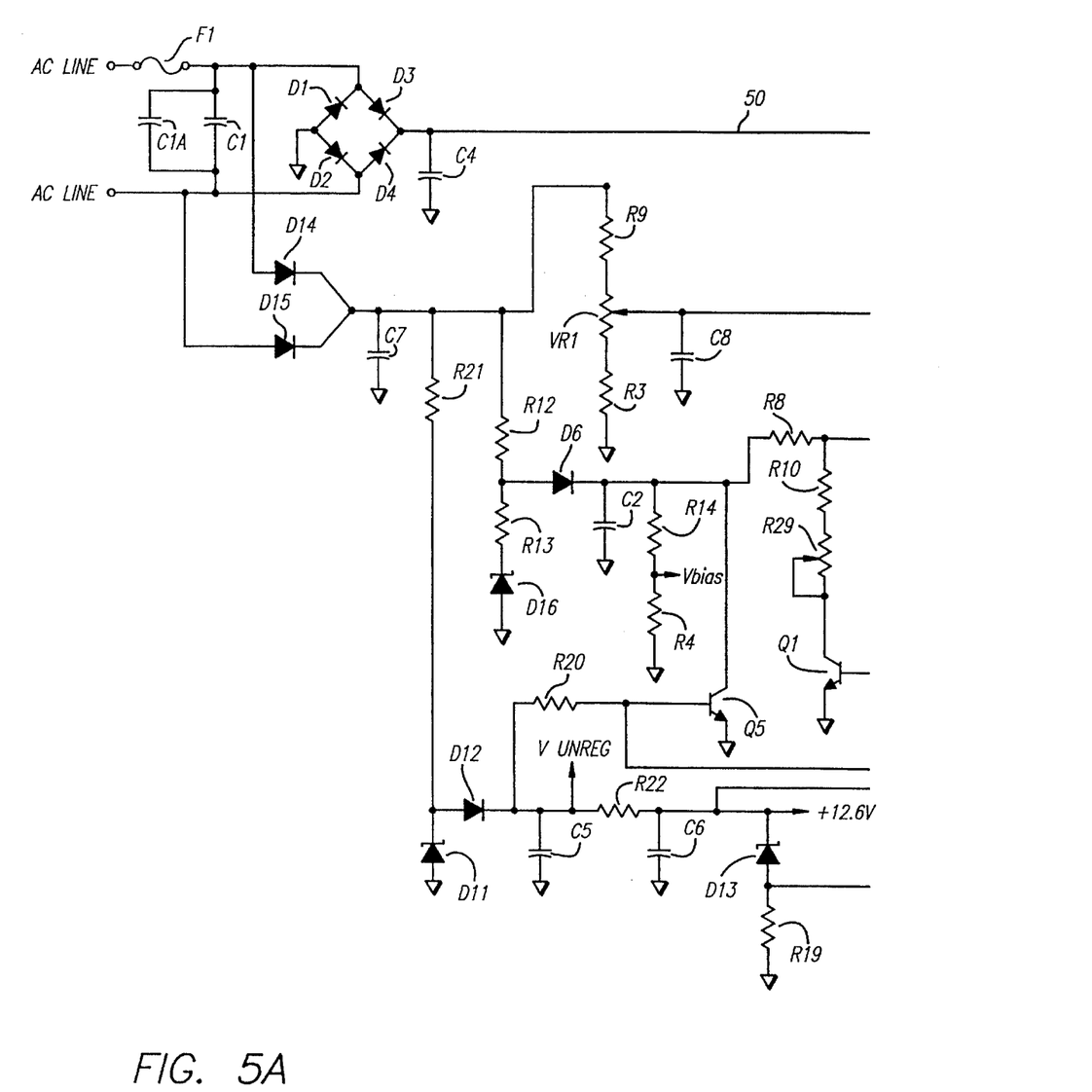
FIGS. 5A and 5B together are a diagram showing the elements of the power supply of FIG. 4 in full circuit detail.
Figure 5B:
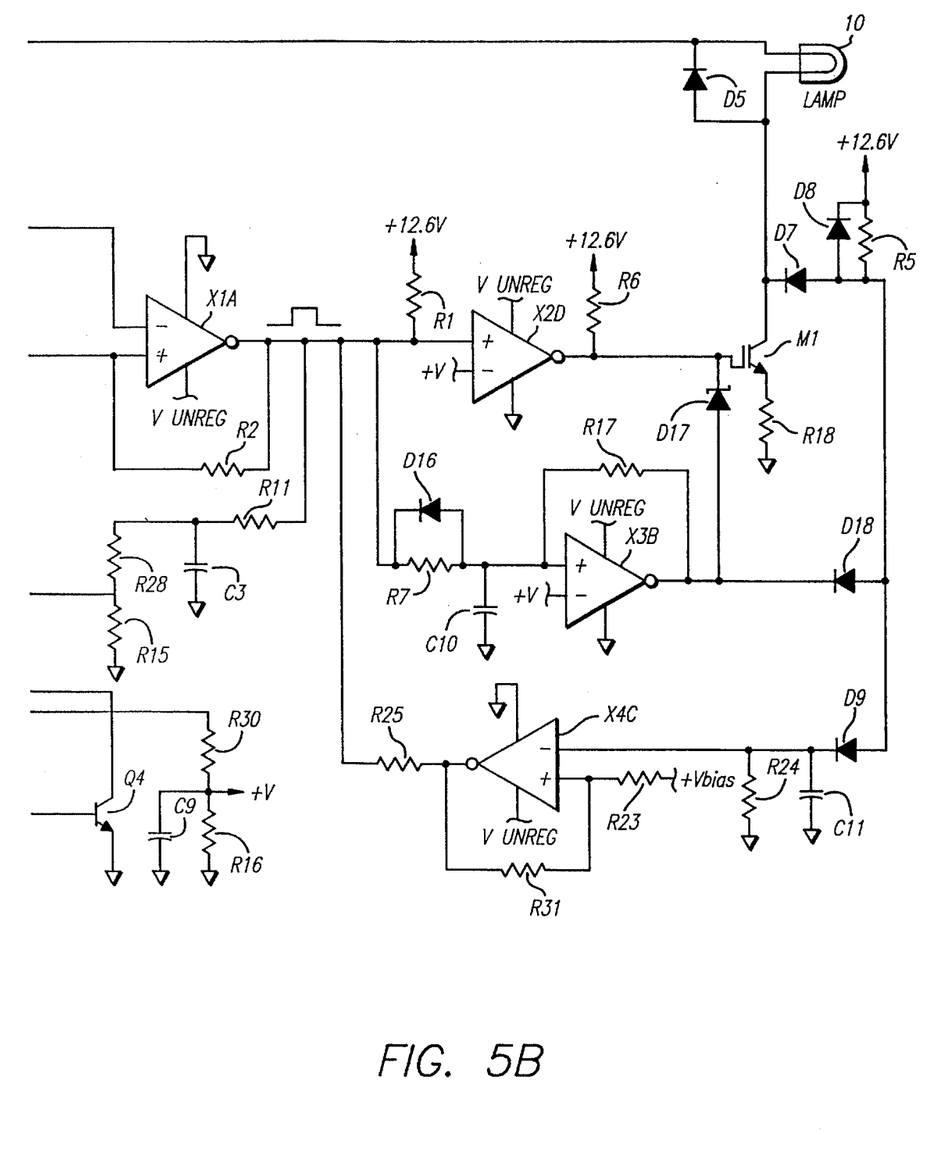

In the embodiment of FIGS. 4, 5A and 5B, an IGBT power switching device M1 is controlled by a simple comparator circuit X1A having two inputs and one output. The first input of comparator X1A is a sample of the full-wave rectified line voltage from diode bridge rectifier D1, D2, D3 and D4 (FIG. 4), and from diodes D14, D15 (FIG. 5A). This first input may be reduced down to a voltage level appropriate for the low-voltage comparator X1A by means, for example, of a voltage divider (R9, R10 in FIG. 4; and R9, VR1, R3 in FIG. 5A), or a small signal-level transformer. In either case, the phase relationship between the output of the comparator X1A and the voltage applied to the lamp 10 itself must be preserved. The second input to comparator X1A is a DC reference voltage. This reference voltage sets the comparator threshold, that is, it sets the voltage at which the output of the comparator changes state.

The threshold of comparator X1A is set so that the comparator output assumes a high state whenever the power line voltage is below a reference level, and changes to a low state whenever the line voltage rises above the reference level. The output of comparator X1A is then used to drive the power switching device M1 connected in series with lamp 10. The result is that voltage is applied to lamp 10 whenever the line voltage is below the threshold. Whenever the line voltage is above the switching threshold of comparator X1A, the power switching device M1 is turned off, and no voltage is applied to the lamp 10.

As shown in FIG. 4, the power supply is connected through a usual EMI filter 11 to the 110-volt 60-cycle AC line. The bridge rectifier made up of diodes D1, D2, D3 and D4 is connected across the output of filter 11. One of the output terminals of the bridge rectifier is grounded, and the other is connected to the incandescent lamp 10. The ungrounded output terminal of the bridge rectifier is also connected to the voltage divider made up of resistors R9 and R10 which, as noted above, serves to reduce the voltage applied to the first terminal of a comparator X1A.

A line voltage compensator circuit 12 is also connected to the output terminal of the bridge rectifier, and its output terminal is connected to the second input terminal of comparator X1A. The line voltage compensator 12 provides a reference voltage for comparator X1A which is compensated for fluctuations in the AC line voltage. The output terminal of comparator X1A is connected back to the second input terminal through a symmetry compensator circuit 14. The symmetry compensator circuit 14 includes a potentiometer which enables adjustments to be made to compensate for any lack of symmetry in the voltage waveform being delivered to lamp 10, which waveform is shown, for example, in FIG. 2. The output of comparator X1A is also connected to the gate of IGBT switching device M1, and through a resistor R6 to the positive terminal V+ of a direct current potential source. The output terminal of comparator X1A is also connected through resistor R7 to the first input terminal of a comparator X3B. Comparator X3B is included in a circuit 16 which constitutes an intermediate voltage turn-on delay and current sense mute circuit.

Resistor R7 in circuit 16 is connected to a grounded capacitor C10. A reference voltage is applied to the second input terminal of comparator X3B. The output terminal of comparator X3B is connected through a Zener diode D17 to the gate of the IGBT M1, and the output terminal is also connected to the lamp 10 through diodes D7 and D18. Zener diode D17 establishes the gate voltage of IGBT M1 at a safe intermediate value for a predetermined time during the initial high state voltage output from comparator X1A.

Diode D18 is also connected to the input of an overcurrent shutdown timer circuit for the IGBT M1, this circuit being contained in block 18. The connection is through a diode D9 which is connected to a resistor R5 and to a grounded capacitor C11. Resistor R5 is connected to the positive terminal of a direct current voltage source. Diode D9 is connected to the negative input terminal of a comparator X4C whose output terminal is connected to the gate of the IGBT M1. The over-current condition monitored by the over-current shutdown timer circuit of block 18 can exist during initial application of voltage to the power supply, or in the event of an overload due, for example, to lamp filament burnout. When lamp filament burnout occurs, the lamp 10 momentarily goes into an arc mode of operation until enough of filament has been burned away to terminate the current flow circuit of FIG. 4, and its functions, will now be described more detail with reference to FIGS. 5A, 5B.

In the circuit of FIGS. 5A, 5B, the diode bridge D1, D2, D3 and D4 is connected to the alternating current line through a fuse F1. The alternating current line is shunted by a 5-microfared capacitor C1 which, in turn, is shunted by a 0.01-microfarad capacitor C1A. Fuse F1 has a rating of 12 amps. The diode bridge is connected to a lead 50, and to a grounded capacitor C4 of 0.01 microfarad. Lead 50 is connected to one terminal of the incandescent lamp 10, which may be a 36-volt, 400 watt, 3300 milli-ohm lamp. The lamp 10 is shunted by a diode D5 which may be of the type designated 1N4007. The diode bridge D1–D4 is a full-wave rectifier.

A low power full-wave rectifier formed by diode rectifiers D14 and D15 is also connected across the AC line. These diodes may each be of the type designated 1N4007. The diode rectifiers D14, D15 are connected together and to a grounded capacitor C7 which has a capacity of 0.01 microfarads. The diode rectifiers D14, D15 are also connected to a resistor R9. Resistor R9, together with a potentiometer VR1 and grounded resistor R3, form a voltage divider between the output of the diode rectifiers D14, D15 and ground. Resistor R9 may have a resistance of 430 kilo-ohms, potentiometer VR1 may have a resistance of 1 kilo-ohm, and resistor R3 may have a resistance of 10 kilo-ohms. The movable arm of potentiometer VR1 is connected to the negative input terminal of comparator X1A, and to a grounded 0.0047-microfarad capacitor C8. Comparator X1A may be of the type designated LM339.

The output of the full-wave diode rectifier D14, D15 is also connected to a resistor R12 which, in turn, is connected to a resistor R13, resistor R13 being connected through a Zener diode D16 to ground. Resistor R12 may have a resistance of 240 kilo-ohms, resistor R13 may have a resistance of 2.2 kilo-ohms, and Zener diode D16 may be of the type designated 1N5227. The junction of resistors R12 and R13 is connected through a diode D6 and through a 100 kilo-ohm resistor R8 to the negative input terminal of comparator X1A. Diode D6 may be of the type designated 1N914. The junction of diode D6 and resistor R8 is connected to a grounded 100-microfarad capacitor C2 and to a pair of resistors R14 and R4, with resistor R4 being grounded. Resistor R14 has a resistance of 3.3 kilo-ohms, and resistor R4 has a resistance of 75 kilo-ohms. Resistor R8 is also connected through a resistor R10, and through a symmetry adjustment potentiometer R29 in the symmetry compensator circuit 14 to the collector of an NPN transistor Q1. Resistor R10 may have a resistance of 180 kilo-ohms, and potentiometer R29 may have a resistance of 50 kilo-ohms. Transistor Q1 is of the type designated 2N3904.

The output of comparator X1A is connected to the symmetry compensator circuit 14 through a 1 mega-ohm resistor R11, which is connected through a 680-kilo-ohm resistor R28 to the base of transistor Q1. The junction of resistor R11 and resistor R28 is connected to a grounded 0.0033-microfarad capacitor C3. The output terminal of the comparator X1A is connected through a 10 mega-ohm resistor R2 back to the positive input terminal.

The elements R12, R13, D6, D16, C2, R14 and R4 form the line voltage compensator represented by the block 12 in FIG. 4; and the elements R8, R10, R29, R28, R15, R11, C3 and transistor Q1 form the symmetry compensator represented by block 14 in FIG. 4.

The output of comparator X1A is connected to the positive input of a second comparator X2D which may also be of the type designated LM339. The positive terminal of the comparator X2D is connected to a +12 volt voltage source through a 10 kilo-ohm resistor R1, and the negative input terminal is connected to a reference voltage source designated +V. The output terminal of the comparator X2D is connected to the gate of the IGBT M1, and through a 10 kilo-ohm resistor R6 to the +12 volt voltage source. The IGBT is connected in series with the lamp 10 and a grounded resistor R18.

The lamp 10 is also connected to the intermediate voltage turn-on delay and current sense mute circuit 16 of FIG. 4, through diode D7 which may be of the type designated 1N4937, and a diode D18 which may be of the type designated 1N914. Circuit 16 also includes a Zener diode D17 which may be of the type designated 1N4738, diode D18, resistor R17 which has a resistance of 2 mega-ohms, comparator X3B which may of the type designated LM339, 880 picofarad capacitor C10, 100 kilo-ohm resistor R7, and diode D16 which may be of the type designated 1N914. As stated above, the foregoing elements all make up the intermediate voltage turn-on delay and current sense mute circuit represented by the block 16 of FIG. 4.

Lamp 10 is also connected through diode D7, and through diode D9 to the IGBT over-current shutdown timer represented by the block 18 in FIG. 4. The lamp 10 is also connected through diode D7 to a 4.7 kilo-ohm resistor R5 which is connected to the +12 volt source, which is shunted by a diode D8 which may be of the type designated 1N914.

The elements in the IGBT over-current shutdown timer circuit 18 include comparator X4C which may be of the type designated LM339, 100 kilo-ohm resistor R23, 3.3 mega-ohm resistor R31, resistor R25, resistor R24, capacitor C11, and diode D9.

The output of full-wave diode rectifier D14, D15 is also connected through a 12 kilo-ohm resistor R21 to the junction of a Zener diode D11 and a diode D12. Diode D12 may be of the type designated 1N914, and Zener diode D11 may be of the type designated 1N5254. Zener diode D11 is grounded, and diode D12 is connected through a 100 kilo-ohm resistor R20 to the base of an NPN transistor Q5 of the type designated 2N3904, the collector of which is connected to the junction of diode D6 and resistor R5, and whose emitter is grounded. Diode D12 is also connected to a grounded 10-microfarad capacitor C5 and to a 1 kilo-ohm resistor R22. Resistor R22 is connected to a grounded 10-microfarad capacitor C6 and to resistors R30 and R16 which, together constitute a voltage divider, resistor R30 having a resistance of 100 kilo-ohms, and resistor R16 also having a resistance of 100 kilo-ohms.

Resistor R16 is shunted by a 0.1-microfarad capacitor C9. The resistor R22 is also connected to a Zener diode D13 which, in turn, is connected to a 100 kilo-ohm resistor R19. The junction of the Zener diode and the resistor R19 is connected to the base of an NPN transistor Q4 of the type designated 2N3904, whose emitter is grounded, and whose collector is connected to the base of transistor Q5.

The elements described above form a circuit for producing the various voltages required in the power supply circuit. The junction of diode D12 and resistor R20 is connected to an output terminal designated $V_{UNREG}$ which supplies unregulated voltage to power pin of all four comparators. The junction of resistor R22 and capacitor C6 is connected to an output terminal designated +12.6 volts, and the junction of resistors R30 and R16 is connected to an output terminal designated +V.

The gate of the insulated gate bipolar transistor (IGBT) switch M1 of FIGS. 4 and 5B is driven by the combination of outputs from comparators X2D and X3B, these outputs being pulled high by resistor R6. During the initial high state voltage output from comparators X1A and X3B via Zener diode D17, the gate voltage of switch M1 is established at an intermediate value. This intermediate voltage at the gate of switch M1 limits the instantaneous collector current that can flow through switch M1, thus providing protection from over current during this time.

At the same time the voltage at the anode of diode D7 is held in a low state through conduction of the output from comparator X3B through diode D18. This prevents charging of capacitor C11. After capacitor C10 is charged via resistor R7 and exceeds the bias voltage at the negative input terminal of comparator X3B, comparator X3B turns off, and the open collector output of the comparator is pulled high through Zener diode D17 by resistor R6. Resistor R17 provides positive feedback which results in hysteresis to prevent unwanted oscillations. At this point the gate voltage of IGBT switch M1 is then allowed to rise to +12.6 volts, which reduces the collector-emitter saturation voltage of M1, thereby improving power supply efficiency.

Collector-emitter saturation voltage of IGBT switch M1 may now be sensed via diode D7 and pull-up resistor R5, because comparator X3B is now in an off state, which results in diode D18 being reversed biased. If the voltage at the negative input terminal of comparator X4C exceeds a specific level, then comparator X4C will turn on and the open collector output will immediately be pulled toward zero volts. This action turns off comparator X2D, which removes the gate drive from switch M1, thereby inhibiting current flow. This over-current condition, as mentioned above, can exist during initial application of voltage to the power supply or in the event of an overload, such as lamp filament burnout. When that occurs, the lamp momentarily goes into an arc mode, reducing lamp resistance until enough of the filament is burned away. During overload, capacitor C11 is charged via diode D9. The recovery time of an overload is determined by the time constant of the circuit formed by resistor R24 and capacitor C11. Resistors R23 and R31 provide hysteresis for comparator X4C to prevent unwanted oscillations.

Logic power is supplied and controlled by the circuit of elements R21, D11, D12, C5, R22, C6, D13 and Q4. Zener diode D11 prevents over-voltage conditions when operating higher line voltage. Diode D12 isolates filter capacitor C5 from the full-wave rectifier, thus preserving voltage waveform at capacitor C7. Resistor R22 limits current which reduces voltage at filter capacitor C6.

During initial application of voltage to the power supply, the voltages at capacitors C5 and C6 will ramp up slowly until the voltage at the cathode of D13 approaches +12.6 volts. Until that time, transistor Q4 remains in an off state and the base of transistor Q5 is pulled high via resistor R20, rendering transistor Q5 conductive and causing the collector of Q5 to remain at near ground potential. This action inhibits the bias voltage for comparator X1A, and causes the output of comparator X1A to remain in a low state. When the voltage at capacitor C6 approaches +12.6 volts, base drive will then be provided for transistor Q4, rendering transistor Q4 conductive and causing the collector of the transistor Q4 to pull down toward ground potential. This action removes the base drive to transistor Q5, rendering transistor Q5 non-conductive, thereby allowing capacitor C2 to start slowly charging, thereby providing a soft start capability. Resistors R30 and R16 provide bias voltages for comparators X2D and X3B. Capacitor C9 provides filtering for the bias voltages.

Figure 6:
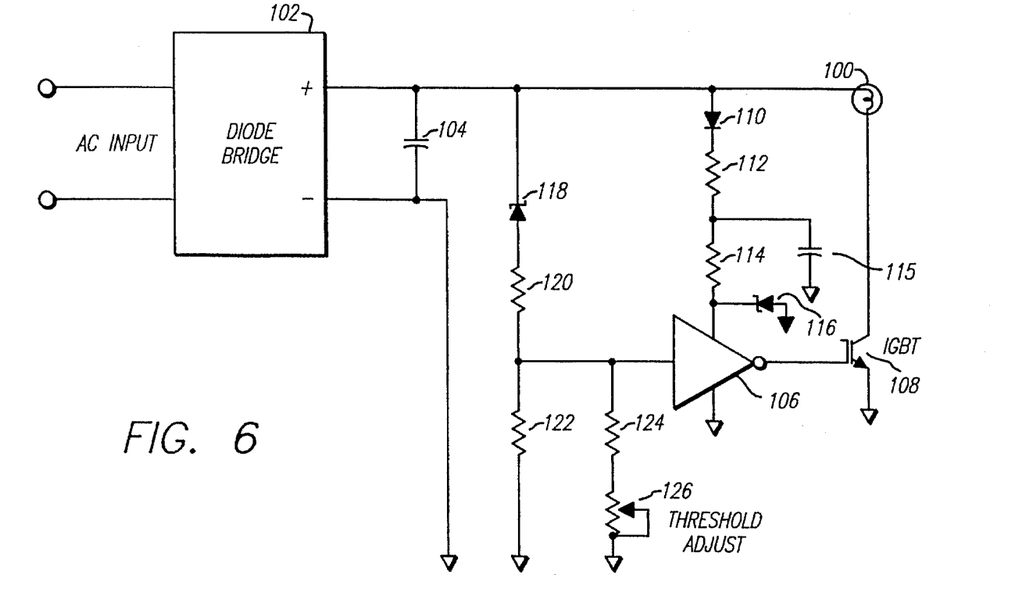
FIG. 6 is yet another embodiment representing a simplified version of the power supply of the invention.

The circuit of FIG. 6 represents a simplified system for controlling, for example, a 400-watt, 36 VRMS incandescent lamp 100. In the system of FIG. 6, the conventional AC line voltage is applied to a 25-amp, 600-volt diode bridge represented by block 102, and which may be of any known circuitry. The positive output from the diode bridge 102 is applied directly to one terminal of lamp 100, and the negative output terminal of the bridge is connected to ground. The output of the diode bridge is shunted by a 0.01-microfarad, 1000 VDC capacitor 104. The Circuit includes a driver 106 which may be of the type designated U4A or U4B in FIG. 3. The output of driver 106 is connected to an IGBT 108, as shown.

The unfiltered output from the diode bridge is applied to the driver 106 through a circuit including a diode 110 which is connected to the driver 106 through a 10-kilo-ohm, 3-watt resistor 112 and a 10-kilo-ohm resistor 114. The junction of resistor 114 and the driver 106 is connected to a 15-volt grounded Zener diode 116. The circuit described above supplies a filtered regulated 15-volt DC voltage to the driver 106 to energize the driver.

The unfiltered output from diode bridge 102 is fed through a 68-volt Zener diode 118 and through a 10-kilosohm resistor 120 to the input terminal of driver 106. The input terminal of driver 106 is also connected to a 100-kilo-ohm grounded resistor 122 which is shunted by a 10-kilo-ohm resistor 124 and a series-connected grounded 100-kilo-ohm potentiometer 126.

The inherent operation of the driver 106 causes its output to change state whenever its input exceeds a threshold established by potentiometer 126. The potentiometer 126 may be set so that the output of the driver 106 changes state for each half cycle of the output of the diode bridge 102, when that output exceeds a predetermined level. Accordingly, the lamp 100 is turned on only during portions of the beginning and ending of each half cycle of the voltage from diode bridge 102, in accordance with the curve shown in FIG. 2.

The invention provides, therefore, unique and simplified power supply for an incandescent lamp, which assure that the lamp is sufficiently energized to reach its design color temperature, this being achieved without exceeding the break-over voltage of the lamp filament.

It will be appreciated that while particular embodiments of the invention have been shown and described, modifications may be made. It is intended in the following claims to cover all such modifications which fall within the true spirit and scope of the invention.

We claim:

1. A power supply for an incandescent lamp, or the like, comprising: an input circuit for supplying a varying voltage to said lamp in a series of cycles; a controllable switch connected in series with said lamp; and control circuit means connected to said switch for causing said switch to conduct only during intervals at the beginning and end of each of said cycles of said varying voltage and when said varying voltage is below a predetermined threshold, in which said input circuit is connected to an alternating current line and includes a full-wave rectifier for supplying said varying voltage to said lamp in a series of sine wave half cycles of a selected polarity.

2. A power supply for an incandescent lamp, or the like, comprising: an input circuit for supplying a varying voltage to said lamp in a series of cycles; a controllable switch connected in series with said lamp; and control circuit means connected to said switch for causing said switch to conduct only during intervals at the beginning and end of each of said cycles of said varying voltage and when said varying voltage is below a predetermined threshold, in which said control circuit means includes a comparator for producing an output having a first state when the varying voltage from said input circuit is below a predetermined reference level and having a second state when the varying voltage from said input circuit is above said predetermined reference level, so as to cause said controllable switch to switch to its conductive state only when the output from said comparator is in a selected one of said first and second states so as to cause said lamp to be energized or fly during predetermined portions of the varying voltage at the beginning and end of each cycle thereof.

3. A power supply for an incandescent lamp, or the like, comprising: an input circuit for supplying a varying voltage to said lamp in a series of cycles; a controllable switch connected in series with said lamp; and control circuit means connected to said switch for causing said switch to conduct only during intervals at the beginning and end of each of said cycles of said varying voltage and when said varying voltage is below a predetermined threshold, in which said controllable switch comprises at least one field-effect transistor.

4. A power supply for an incandescent lamp, or the like, comprising; an input circuit for supplying a varying voltage to said lamp in a series of cycles; a controllable switch connected in series with said lamp; and control circuit means connected to said switch for causing said switch to conduct only during intervals at the beginning and end of each of said cycles of said varying voltage and when said varying voltage is below a predetermined threshold, in which said controllable switch comprises at least one insulated gate bipolar transistor.

5. A power supply for an incandescent lamp, or the like, comprising: an input circuit for supplying a varying voltage to said lamp in a series of cycles; a controllable switch connected in series with said lamp; and control circuit means connected to said switch for causing said switch to conduct only during intervals at the beginning and end of each of said cycles of said varying voltage and when said varying voltage is below a predetermined threshold, in which said control circuit means includes a comparator for producing an output having a first state when the varying voltage from said input circuit is below a predetermined reference level and having a second state when the varying voltage from said input circuit is above said predetermined reference level, so as to cause said controllable switch to switch to its conductive state only when the output from said comparator is in a selected one of said first and second states so as to cause said lamp to be energized only during predetermined portions of the varying voltage at the beginning and end of each cycle thereof, and in which said comparator has first and second input terminals and an output terminal, and which includes first circuitry connecting said first input terminal to said input circuit and second circuitry connecting said second input terminal to a source of reference potential.

6. The power supply defined in claim 5, and which includes line voltage compensating circuitry included in said second circuitry for compensating for fluctuations in the voltage of the sine wave half cycles from said input circuit.

7. The power supply defined in claim 5, and which includes symmetry compensating circuit connected from the output terminal of said comparator to the second input terminal for compensating for lack of symmetry in the voltage waveform delivered to said lamp.

8. The power supply defined in claim 7 in which said symmetry compensating circuitry includes a potentiometer for adjusting the symmetry of the voltage waveform delivered so said lamp.

9. The power supply defined in claim 2, and which includes an intermediate voltage turn-on delay circuit connected to the output terminal of said comparator for establishing the voltage applied to said switch by said comparator at a predetermined intermediate value whenever the output of said comparator exceeds a predetermined threshold.

10. The power supply defined in claim 2, and which includes an over-current shutdown timer circuit connected to said switch for responding to current flow through said switch in excess of a predetermined threshold to remove the voltage applied to said switch from said comparator for a predetermined time interval.

* * * * *